United States Patent [19]

Zwicker

[11] Patent Number: 5,009,910

[45] Date of Patent: Apr. 23, 1991

[54] METHOD OF FORMING PRETZELS FROM STRANDS OF DOUGH

[76] Inventor: Horst Zwicker, Grabenstrasse 22, 7320 Göppingen, Fed. Rep. of Germany

[21] Appl. No.: 477,344

[22] Filed: Feb. 7, 1990

[30] Foreign Application Priority Data

Feb. 8, 1989 [DE] Fed. Rep. of Germany ....... 3903701

[51] Int. Cl.⁵ .............................................. A21D 3/08
[52] U.S. Cl. .................................. 426/499; 425/320; 425/323; 426/500
[58] Field of Search ................ 426/499, 500; 425/320, 425/323

[56] References Cited

U.S. PATENT DOCUMENTS

| 2,071,321 | 7/1933 | Adler | 425/323 |
| 2,090,291 | 8/1937 | Gipe | 425/323 |
| 2,114,951 | 4/1938 | Young et al. | 425/323 |
| 2,161,267 | 6/1939 | Young et al. | 425/323 |

FOREIGN PATENT DOCUMENTS

| 569387 | 1/1959 | Canada | 425/323 |
| 444790 | 2/1968 | Switzerland | 425/323 |

Primary Examiner—Donald E. Czaja
Assistant Examiner—D. Workman
Attorney, Agent, or Firm—Henry M. Feiereisen

[57] ABSTRACT

In a pretzel forming apparatus and method, dough strands are continuously conveyed at arbitrary distance from a receiving station via a knot forming station to a releaase station. Upon entering the receiving station, the ends of each dough strand are grasped by U-shaped grip belts which move the ends toward each other during transport of the dough strand from the receiving station to the knot forming station so as to form a bow-shaped loop with its center portion and side portions. In the knot forming station, opposing brush rolls turn the bow-shaped loop by 360° to form a knot in vicinity of the ends of the dough strand. Thereafter, the bow-shaped loop is folded upwards until occupying a horizontal position. After being suitably moved apart by the grip belts during the transport from the knot forming station and the release station, the ends of the dough strand disengage from the grip belts and sink by virtue of their own weight onto the side sections.

7 Claims, 3 Drawing Sheets

METHOD OF FORMING PRETZELS FROM STRANDS OF DOUGH

BACKGROUND OF THE INVENTION

The present invention refers to a method of and apparatus for forming pretzels from strands of dough.

German patents DE-PS 4567,308, 571,517, 576,788, 1,532,330, 1,170,884, 1,782,289, 1,432,965, 2,113,773, 1,288,532 and German publication DE-OS 2,210,845 and 2,731,997 describe a method for forming pretzels from strands of dough by forming a knot in two opposing side portions between a center portion and the ends of the dough strand through relative twisting the side portions by 360° and by connecting the ends with the side portions in the area between the knot and the center portion.

These known methods described in the publications have in common that the dough strands can be processed into pretzels only at constant time intervals because the apparatus operates in cycles. Furthermore, in all these methods the ends of each dough strand are intertwined during formation of the knot while the center portion and the side portions of the dough strands are kept stationary at least over part of the knot formation stage. Thus, the known methods yield only a slightly higher or even a smaller output per unit of time in comparison to the output per unit of time yielded during manual production. Moreover, by intertwining the ends while keeping the center portion stationary, the apparatus for carrying out these known methods becomes comparatively complicated and susceptible to failure. Currently, there exists no pretzel forming apparatus which produces a higher yield of pretzels per unit of time than through manual production and yet produces pretzels of a same quality as through manual production.

SUMMARY OF THE INVENTION

It is thus an object of the present invention to provide an improved method and apparatus for forming pretzels from dough strands obviating the afore-stated drawbacks.

This object and others which will become apparent hereinafter are attained in accordance with the present invention by continuously conveying the dough strands at arbitrary distance between a receiving station in which the ends of the dough strands are grasped and the dough strands define a bow-shaped loop between the grasped ends, a knot forming station in which the bow-shaped loop is turned about a vertical axis relative to the ends by 360° to form a knot and a release station in which the ends of the dough strands are released and allowed to sink onto the side portions by virtue of their own weight, whereby the ends are moved toward each other during their transport between the receiving station and the knot forming station and whereby the bow-shaped loop is upwardly folded about a horizontal axis below the knot into a horizontal position below the ends during transport of the dough strands from the knot forming station to the release station.

With a pretzel forming method according to the invention, the dough strands can be continuously conveyed and processed at arbitrary time intervals. The output attained with this method is extremely high e.g. 3000 pretzels per hour.

Preferably, in the knot forming station, the bow-shaped loop of the dough strands is intermittently rotated over 360° to limit the effect of centrifugal forces thereon, i.e. initially the bow-shaped loop is rotated by 180°, braked, and rotated again by 180° to complete the 360° revolution.

After releasing the ends, the dough strand is squeezed under a drum for pressing the ends onto the side portions to finalize the pretzel forming process.

According to a further feature of the present invention, an apparatus for forming pretzels from strands of dough includes two adjacent endless grip belts which are folded inwardly to define a U-shaped configuration for grasping the oncoming ends of dough strands and for continuously transporting the dough strands from the receiving station to the release station. Between the receiving station and knot forming station, the grip belts converge to allow each dough strand to form a bow-shaped loop below the ends before entering the knot forming station. Suitably, during transport of the dough strand from the receiving station to the knot forming station, the center portion and the side portions as defined between the grasped ends of the dough strand are supported by a downwardly slanting support. In the knot forming station, the bow-shaped loop may be turned by a pair of opposing drive units which are spaced apart transversely to the conveying direction and are synchronously rotatable in a same direction about a vertical axis.

Preferably, each drive unit includes a roll which is provided about its periphery with radial blades in form of e.g. brushes which are angularly spaced at predetermined distance and by which the bow-shaped loop are pushed and braked, respectively.

Extending between the knot forming station and the release station below the grip belts is an upwardly slanting conveyor belt by which the bow-shaped loop, after formation of the knot, is folded upwardly into a horizontal position. In the release station, the grip belts diverge to move the ends of the dough strands apart and the ends are simultaneously released from the grip belts to sink onto the side portions by virtue of their own weight. Subsequently, the dough strand is squeezed under a drum successively arranged from the release station to press the ends against the side portions in an area between the knot and the center portion.

The pretzel forming apparatus according to the present invention is robust and allows a continuous and reliable operation to attain a high output of pretzels at a quality which is comparable to manual production. Further, the operating speed is adjustable to adapt the apparatus according to the invention to the needs of the bakery and to allow the pretzels to be shaped according to the demands by the customer.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
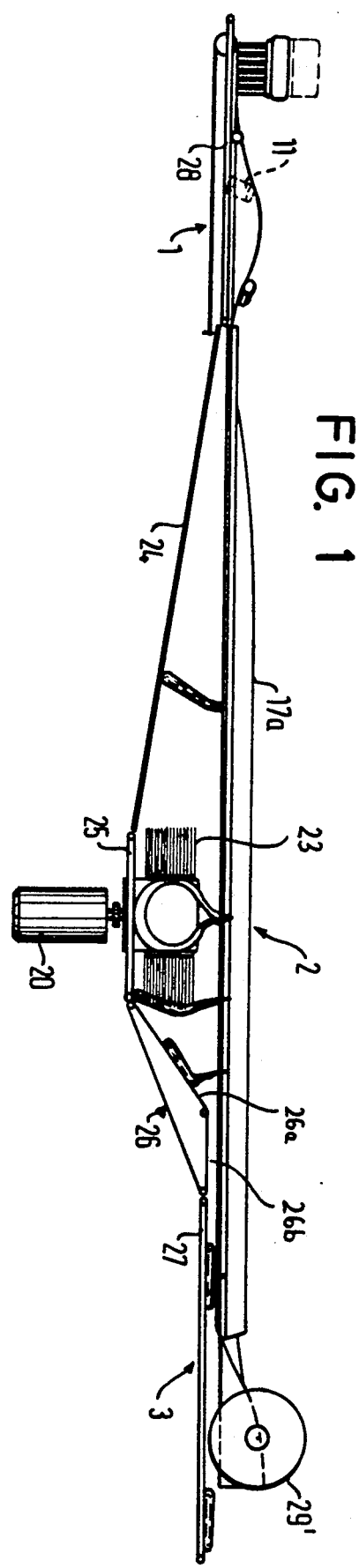
FIG. 1 is a schematic side view of one embodiment of a pretzel forming apparatus according to the present invention.
Figure 2:
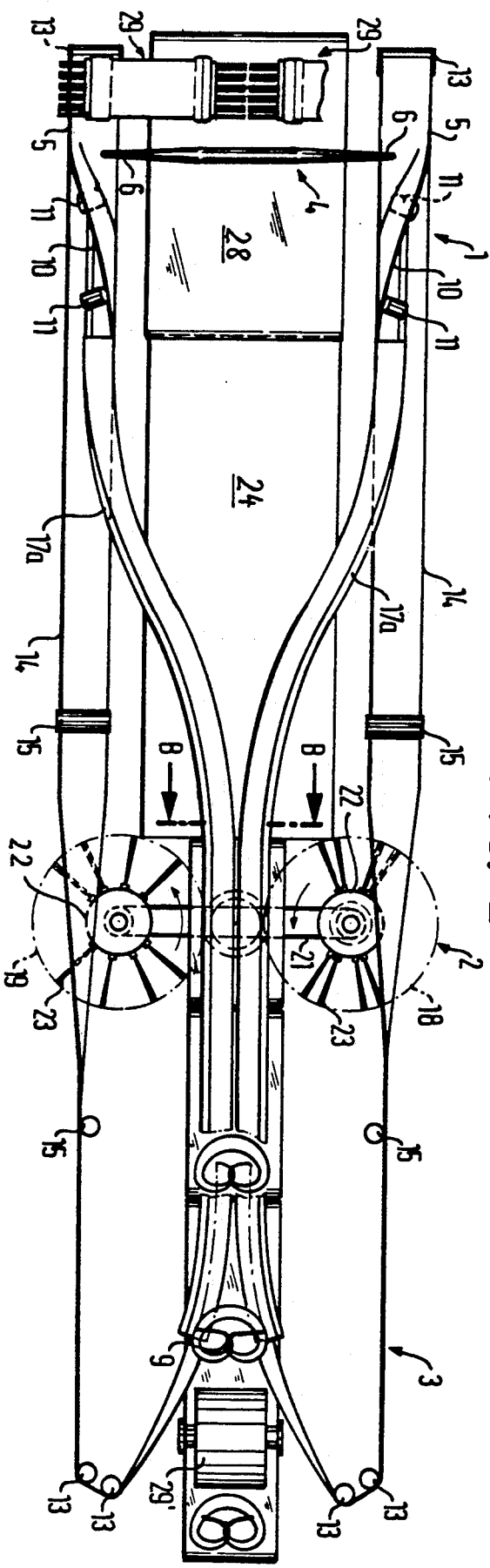
FIG. 2 is a schematic top view of the pretzel forming apparatus according to FIG. 1.
Figure 3:
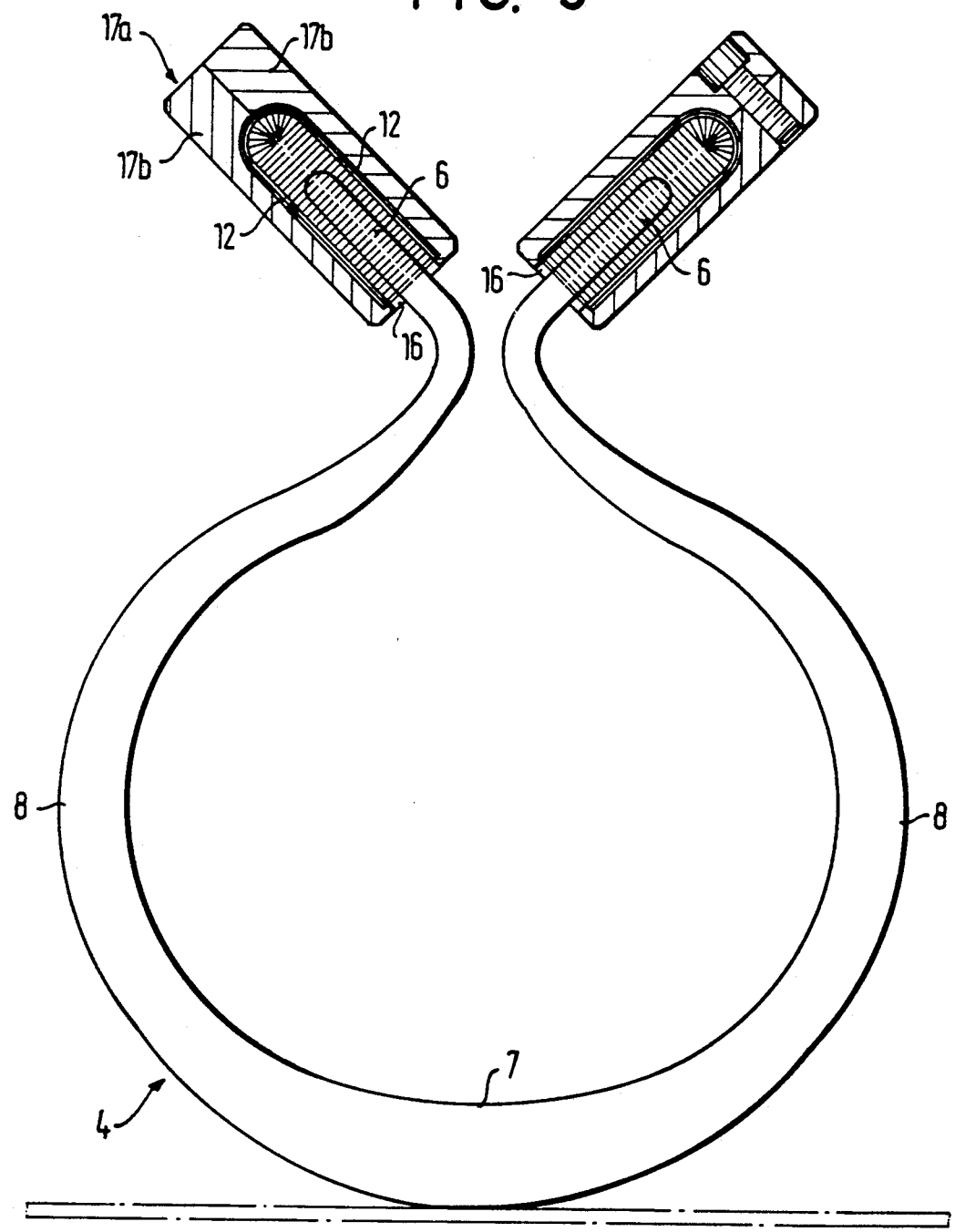
FIG. 3 is a sectional view of the pretzel forming apparatus taken along the line III—III in FIG. 2 and illustrating in detail two grip belts for guiding a dough strand.

Referring now to the drawing, and in particular to FIGS. 1 to 3, there is shown a pretzel forming apparatus 10 by which a dough strand supplied from a respective dough strand maker is formed into pretzel shape by passing through various stations successively arranged in direction of arrow A. In conveying direction A, the pretzel forming apparatus includes a receiving station 1 which is followed by a knot forming station 2 and a release station 3.

Strands of dough such as dough strand 4 are successively supplied from the respective dough strand maker in arbitrary manner to the receiving station 1 by means of a suitable conveyor belt 28, with the ends 6 of each dough strand 4 projecting beyond the lateral edges of the conveyor belt 28. Adjacent grip belts 5 cooperate with the conveyor belt 28 to properly grasp the ends 6 of the dough strand 4 and to transport the dough strand 4 in direction of arrow A to the knot forming station 2. As shown in particular in FIG. 3, the remaining portion between the ends 6 of the dough strand 4, i.e. the central portion 7 and the side portions 8 of the dough strand 4, describe a bow-shaped loop before entering the knot forming station 2 in which the bow-shaped loop is turned by 360° relative to the ends 6 to form a knot 9 in vicinity of the ends 6 of the dough strand 4. After formation of the knot 9 the thus-shaped dough strand 4 is conveyed to the release station 3 in which the ends 6 of the dough strand 4 are disengaged from the grip belts 5 and sink by virtue of their own weight onto the side portions 8 in an area between the central portion 7 and the knot 9.

Each grip belt 5 is designed as endless conveyor belt and includes an upper run 10 moving in conveying direction A and extending essentially in a horizontal plane. By means of support rollers 11 suitably arranged at the receiving station 1, the upper run 10 of each grip belt 5 is inwardly folded to define a U-shaped configuration with two legs 12 between which the ends 6 of the dough strand 4 are grasped and securely clamped as illustrated in particular in FIG. 3. In this manner, the U-shaped upper run 10 of the grip belts 5 continuously transport the dough strands 4 at arbitrary distance from each other through the various stations of the pretzel forming apparatus until releasing the dough strands 4 in the release station 3.

After releasing the ends 6 of the dough strand 4, the grip belts 5 are trained about deflection pulleys 13 which are arranged at the exit of the release station 3 and are rotatable about vertical axes. At the entrance to the receiving station 1, further deflection pulleys 13 are arranged which are rotatable about horizontal axes so that the grip belts 5 are returned to a planar shape before being folded inwardly for grasping and picking up a dough strand 4 from the conveyor belt 28. Suitable support rollers 15 are arranged along the lower run 14 of the grip belts 5 to ensure a proper course of the lower run 14 and to properly support the latter.

Suitably, the external surface of the grip belts 5 is coated with a velour carpet like texture which is resilient and very tacky for superior grasping of the dough strands 4. When being folded, the fibers are facing each other as is shown in FIG. 3.

Turning now in particular to FIG. 3, there is shown that the U-shaped upper run 10 of each grip belt 5 is guided between the receiving station 1 and the release station 3 in a guide channel 16 of a U-shaped guide member 17a which preferably is assembled by suitably threading or screwing together two halves 17b. Both guide members 17a are symmetrically curved inwardly toward each other in S-shape from the receiving station 1 to the knot forming station 2 so that the guide belts 5 approach each other until extending parallel at a small distance (FIG. 2). The grip belts 5 pass through the knot forming station 2 in parallel relationship until reaching the release station 3 in which the guide members 17a curve outwards to increase the distance between the grip belts 5 and are bent outwards in order to widen the guide channels 16. The widening of the guide channels 16 reduces the clamping action by which the ends 6 of the dough strand 4 are gripped by the upper run 10 of the grip belts 5 so that the ends 6 of the dough strand 4 are allowed to slide out from the fold of the upper run 10 of the grip belts 5 and to sink onto the side portions 8. After releasing the ends 6 of the dough strands, the grip belts 5 are trained about the vertical deflection pulleys 13, with the grip belts 5 returning along their lower run 14 into the planar orientation.

Describing now the formation of the knot 9 with reference to FIGS. 1 and 2, it can be seen that the knot forming station 2 is provided with a pair of drive elements generally designated by reference numerals 18, 19 by which the bow-shaped loop of the dough strand 4 is turned by 360°. In the nonlimiting example as shown in the drawing, each drive element 18, 19 is of the rotor type and includes a roll 22 which is rotatable about a vertical axis and provided with eight radially extending blades in form of brushes 23 which are of such radial dimension as to project into the path of the passing bow-shaped loop of the dough strand 4. The brushes 23 are arranged at different angular distances, with the angular distances of the brushes 23 of the drive element 18 being different from the angular distances of the brushes 23 of the drive element 19.

The drive elements 18, 19 are in spaced-apart relationship transversely to the conveying direction A and are rotated in synchronism with each other. The guide members 17a which accommodate the grip belts 5 extend between the parallel axes of rotation of the brush rolls 22 above the drive elements 18, 19. A motor 20 drives the brush rolls 22 via a drive element 21 such as an endless belt or toothed belt to thereby rotate the drive elements 18, 19 in synchronism in a same direction.

The arrangement of the brushes 23 of each brush roll 22 is such that four brushes 23 are used to perform a complete 360° revolution of the bow-shaped loop of the dough strand 4. Thus, by providing each roll 22 with eight brushes 23, a complete revolution of both brush rolls 22 allows a turning of two successive dough strands 4 by 360°.

Actuation of the drive elements 18, 19 occurs only when a dough strand 4 enters the knot forming station 2. In contrast thereto, the grip belts 5 are continuously operated i.e. the dough stands 4 are transported through the pretzel forming apparatus at essentially constant velocity without stoppage. The angular distance between the brushes 23 of the rolls 22 is selected in such a manner that two slantingly opposing brushes 23 of the rolls 22 force the bow-shaped loop of the dough strand 4 to rotate by 180° from its initial position to an intermediate position, two following opposing brushes 23 brake the rotation of the bow-shaped loop; the next opposing pair of brushes 23 completes the 360° revolution of the bow-shaped loop from its intermediate position to the end position while the next pair of opposing brushes 23 brakes the bow-shaped loop again after the latter completes the 360° revolution.

Thus, the formation of the knot 9 is carried out stepwise, by initially turning the bow-shaped loop by 180°, braking the rotation, completing the rotation to 360° and again braking the rotation. By dividing the 360° revolution of the bow-shaped loop in two steps, centrifugal forces are prevented from acting upon the bow-shaped loop. Turning the bow-shaped loop in one step by 360° would usually result in centrifugal forces of such magnitude that the bow-shaped loop might be excessively deformed. Evidently, the degree of deformation depends on the viscosity or strength of the respective type of dough. Thus, under certain circumstances, it is conceivable to turn the loop in one step without encountering any deformation if the dough strand is of suitable composition or preparation.

As previously mentioned, the drive elements 18, 19 are actuated upon entrance of a dough strand 4 into the knot forming station 2. This process may be monitored by a control unit such as e.g. a light barrier which registers the advancing dough strand 4. The brush rolls 22 operate intermittently, i.e. after the bow-shaped loop is positioned between the drive elements 18, 19, the control unit actuates the brush rolls 22 so as to cause the respectively opposing brushes 23 to push the bow-shaped loop and to turn it without any additional external forces by 180°. After pushing the bow-shaped loop, the brush rolls 22 are stopped so that the following pair of brushes 23 which interposes the path of the bow-shaped loop acts as stop member for the bow-shaped loop. Thereafter, the brush rolls 22 are actuated again so that the following pair of brushes 23 pushes the bow-shaped loop to complete the 360° revolution and then stopped again for the next pair of brushes 23 to act as stop surface. Thus, the brushes 23 are employed in such a manner that one side thereof may act as push or impact surface by which the bow-shaped loop is pushed to rotate while the other side may act as a stop surface by which the bow-shaped loop is braked and stopped.

The bow-shaped loop of the dough strand 4 is oriented in the initial position as well as in the end position in a vertical plane which extends perpendicular to the conveying direction A.

It will be readily recognized that the bow-shaped loop of the dough strand 4 is acted upon twice in order to describe a complete revolution for forming the knot 9 in the station 2. After the initial impact and push, the turning of the bow-shaped loop is attained without any additional external forces, i.e. the bow-shaped loop turns freely so that centrifugal forces can fully act upon the bow-shaped loop to ensure the formation of the knot 9 in immediate vicinity of the ends 6 of the dough strand 4. Tensile stresses in the side portions 8 lead to a firm knot 9.

As previously outlined, the grip belts 5 operate continuously so that each dough strand 4 is advanced in conveying direction A during the formation of the knot 9. It will be readily recognized that such continuous transport of the dough strand 4 does not interfere with the knot forming process and is taken into account upon selecting the angular distances between the brushes 23 and upon selecting the speed by which the drive elements 18, 19 are rotated.

As is further shown in particular in FIG. 1, the pretzel forming apparatus includes in prolongation of the conveyor belt 28 a support 24 which slants downwardly between the receiving station 1 and the knot forming station 2. The support 24 may be a simple sheet metal plate or a conveyor belt and is arranged below the upper run 10 of the grip belts 5. When the grip belts 5 grasp the ends 6 of the oncoming dough strand 4, the support 24 supports the center portion 7 and the thus obtained bow-shaped loop during advance of the dough strand 4 to the knot forming station 2. In case the support 24 is a sheet metal plate and is fixedly attached, the bow-shaped loop simply slides down the support 24 as shown in FIG. 1. At its lower end, the support 24 is connected to a horizontal conveyor belt 25 which serves as support for the advancing dough strand 4 during the knot forming stage. The upper run of the conveyor belt 25 has the same speed as the upper run 10 of the grip belts 5 which thus move synchronously with the conveyor belt 25.

After formation of the knot 9 in station 2, the dough strand 4 is supported by a further conveyor belt 26 which moves in conveying direction A and extends in prolongation of the conveyor belt 25. The upper run of the conveyor belt 26 is divided in two sections 26a, 26b, with section 26a extending slantingly upwards and section 26b extending horizontally. The conveying speed of the conveyor belt 26 is adjustable to control the manner by which the bow-shaped loop is transported relative to the ends 6 of the dough strand 4 and to vary the position at which the ends 6 of the dough strand 4 are lowered onto the side portions 8 in the release station 3. In the nonlimiting example of FIG. 1, the velocity of the conveyor belt 26 is such that the bow-shaped loop of the dough strand 4 faces backwards when being placed on the upward section 26a so that the center portion 7 trails the ends 6 of the dough strand 4.

When the velocity of the conveyor belt 26 exceeds the velocity of the grip belts 5, the bow-shaped loop with its central portion 7 and side portions 8 faces forwards when being placed on the upward section 26a so that the center portion 7 leads the ends 6 of the dough strand 4.

In both cases, i.e. at leading or trailing center portion 7, a change of velocity of the conveyor belt 26 allows a variation of the position at which the ends 6 of the dough strand 4 are put down on the side portions 8 after being released from the grip belts 5. Thus, the baker is in a position to make pretzels with a shape according to the demands by the customers.

As is further shown in particular in FIG. 1, a further conveyor belt 27 extends in prolongation of the conveyor belt 26 in order to advance the pretzel-shaped dough strand through and from the release station 3. The conveyor belt 27 extends below the grip belts 5 in a horizontal plane and moves in synchronism with the grip belts 5.

Figure 4:
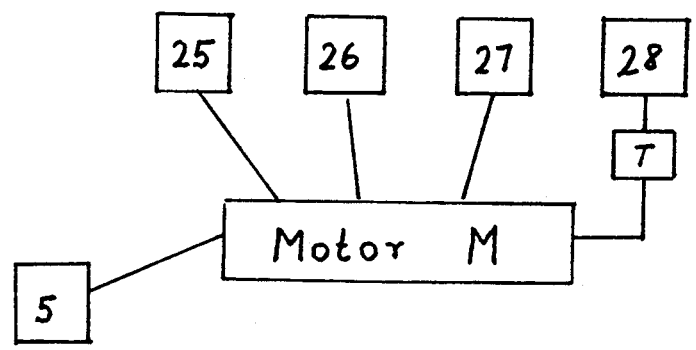
FIG. 4 is a schematic block diagram, illustrating the drive mechanism for the various conveyor units of the pretzel forming apparatus.

As shown in FIG. 4, the conveyor belts 25, 26, 27, 28 are driven by a common motor M, with conveyor belt 26 being connected to the motor M via a transmission T to allow control of the velocity by which the conveyor belt 26 is driven.

In order to ensure that only straight dough strands 4 enter the receiving station 1, two brushes 29 are arranged above the conveyor belt 28 prior to the receiving station 1. The brushes 29 rotate in opposite direction to each other about parallel axes of rotation which are oriented in conveying direction A, with their peripheral speed being outwardly directed at the underside. A crooked or bent dough strand 4 supplied from the dough strand maker is thus advanced through the space between the brushes 29 and the upper run of the conveyor belt 28 and straightened by the brushes 29 before entering the receiving station 1.

As is further shown in FIGS. 1 and 2, a drum 29' is arranged after the release station 3 at a small distance above the conveyor belt 27 to define a gap between the underside of the drum 29' and the upper run of the conveyor belt 27. The drum 29' is rotatable about a horizontal axis which is oriented transversely to the conveying direction A. The drum 29' may freely rotate or may be driven, with its direction of rotation being selected in such a manner that its peripheral speed at its underside is directed in conveying direction. After being released from the grip belts 5, the dough strand 4 is forced through the gap between the drum 29' and the conveyor belt 27 and thereby compressed, with the ends 6 being pressed upon the side portions 8 in the area in which they are put down. Since the dough is elastic, the formed dough strand 4 returns to its previous shape after advancing past the drum 29'.

After passing drum 29', the dough strands 4 have their final pretzel shape and are transported away for further processing.

The following describes the mode of operation of the pretzel forming apparatus in detail insofar as not already clearly apparent from the preceding description.

After being straightened by the brushes 29 and entering the receiving station 1, the ends 6 of the dough strand 4 are grasped and clamped between both legs 12 of the U-shaped upper run 10 of the grip belts 5 and advanced in conveying direction A. By converging the grip belts 5 in the area between the receiving station 1 and the knot forming station 2, the ends 6 of the dough strand 4 are moved toward each other and the center portion 7 and the side portions 8 slide along the support 24 to form the bow-shaped loop, as shown in FIG. 3, before the dough strand 4 enters the knot forming station 2. The cooperating brush rolls 22 in the knot forming station 2 turn the bow-shaped loop by 360° in the manner as previously described to create the knot 9 in vicinity of the ends 6. During the formation of the knot 9, the dough strand 4 is advanced by the grip belts 5 in conveying direction A.

Upon exiting the knot forming station 2, the center portion 7 and then the side portions 8 are placed upon the upwardly extending section 26a of the conveyor belt 26, with the center portion 7 and the side portions 8 being upwardly folded below the knot 9 about a horizontal axis which extends transversely to the conveying direction A. After being transferred to the horizontal section 26b of the conveyor belt 26 and occupying a horizontal position below the ends 6, the dough strand 4 is transferred to the conveyor belt 27, with the ends 6 still being clamped by the grip belts 5. In the release station 3, the grip belts 5 diverge and the U-shaped fold of the upper run 10 opens so that the ends 6 disengage from the grip belts 5 and sink by virtue of their own weight onto the side portions 8 in the area between the knot 9 and the center portion 7. The released dough strand 4 is advanced by the conveyor belt 27 past the drum 29' which presses the ends 6 against the side portions 8 to finalize the pretzel forming process.

The strands of dough are continuously conveyed through the various stations of the pretzel forming apparatus, with the distance between successive dough strands being arbitrary and with the individual shaping steps being independent of any cycles.

Figure 5:
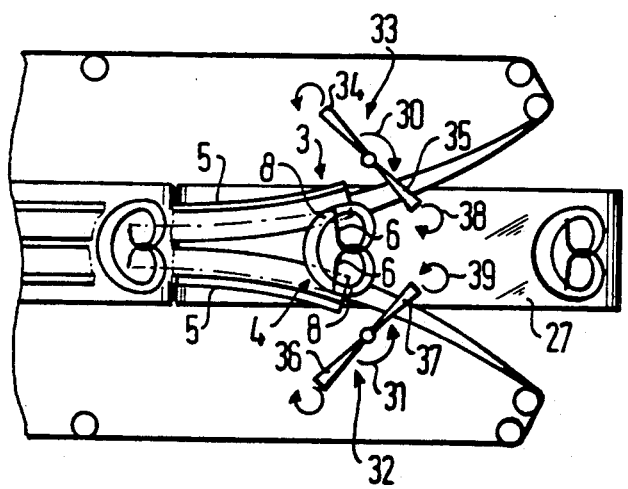
FIG. 5 is a top view of a detail of a modified pretzel forming apparatus according to the present invention.

Turning now to FIG. 5, there is shown a schematic illustration of a modification of the mechanism by which the ends 6 are pressed onto the side portions 8. Following the release station 3, two roll units 32, 33 are arranged at each side of the conveyor belt 27 in spaced-apart relationship transversely to the conveying direction A. The roll units 32, 33 rotate about a vertical axis in opposite direction to each other as indicated by arrows 30, 31 and each includes two radial arms 34, 35; 36, 37 which extend in opposite direction relative to the respective axis of rotation and freely rotate about their longitudinal axis. Each arm 34, 35, 36, 37 is flared outwardly.

During operation, the arms 34, 35, 36, 37 of the roll units 32, 33 rotate at a distance above the upper horizontal run of the conveyor belt 27 along a circular path about the axis of rotation of the respective roll unit 32, 33 and roll upon the passing dough strand 4 to pull the ends 6 onto the side portions 8 and to press them thereagainst. Pulling the ends 6 of the dough strand 4 onto the side portions 8 can be enhanced by either driving the arms in direction of the arrows 38, 39 so that their peripheral speed slightly exceeds the conveying velocity of the dough strand 4, or by braking the arms when rolling upon the dough strand 4.

Those skilled in the art will understand that changes or modification can be made in the preferred embodiments here described, and that these embodiments can be used for other purposes. Such changes and modifications are within the scope of the invention. For example, instead of two opposing brush rolls 22, it is certainly conceivable to arrange two successive pairs of brush rolls, with the first pair turning the bow-shaped loop by 180° and the subsequent pair turning the bow-shaped loop from 180° to 360°. Also, rotary plates may be used instead of brush rolls, with the rotary plate supporting the center portion of the dough strand and rotating by 360° so that the bow-shaped loop is turned accordingly to form the knot.

Further, the guide members 17a may also be made of a single U-shaped sheet metal of special sheet.

While the invention has been illustrated and described as embodied in a pretzel forming method and apparatus, it is not intended to be limited to the details shown since various modifications and structural changes may be made without departing in any way from the spirit of the present invention.

What is claimed as new and desired to be protected by Letters Patent is set forth in the appended claims:

I claim:

1. A method of forming pretzels from strands of dough, comprising the steps of:
   grasping an oncoming dough strand in a receiving station at its ends;
   moving the ends of each dough strand toward each other during transport of the dough strand from the receiving station to a knot forming station, whereby the remaining portion between the ends is lowered below the ends to define a bow-shaped loop with a central portion and opposing side portions;

turning the bow-shaped loop in the knot forming station about a vertical axis relative to the ends by 360° to form a knot;

upwardly folding the bow-shaped loop about a horizontal axis below the knot into a horizontal position below the ends during transport of the dough strand from the knot forming a station to a release station; and releasing the ends of the dough strand in the release station to allow the ends to sink onto the side portions by virtue of their own weight, wherein the dough strands are continuously advanced in conveying direction at arbitrary distance from each other between the receiving station, the knot forming station and the release station, without stoppage during said turning step in the knot forming station.

2. A method as defined in claim 1 wherein said turning step includes pushing the bow-shaped loop to effectively turn same over a major portion of its 360° revolution without requiring any additional outside stimulation.

3. A method as defined in claim 1 wherein said turning step includes pushing the bow-shaped loop to rotate same by 180° from an initial position to an intermediate position without requiring any additional outside stimulation, braking the bow-shaped loop after rotation of 180°, pushing the bow-shaped loop to rotate same by 180° from the intermediate position into an end position to complete a 360° revolution without requiring any additional outside stimulation, and braking the bow-shaped loop after completing the 360° revolution.

4. A method as defined in claim 1 wherein said releasing step includes moving apart the ends of the dough strand in the release station.

5. A method as defined in claim 1, and further comprising the step of rolling a drum upon the shaped dough strand after said releasing step for pressing the ends onto the side portions.

6. A method as defined in claim 1 wherein said moving step includes supporting the center portion of the bow-shaped loop during transport of the dough strands from the receiving station to the knot forming station.

7. A method as defined in claim 1, and further comprising the step of aligning oncoming dough strands before said grasping step to feed the dough strands in a straight configuration.

* * * * *